ated under 35 U.S.C. 154(b) by 248 days.

United States Patent
Miyasaka

(10) Patent No.: US 9,290,634 B2
(45) Date of Patent: *Mar. 22, 2016

(54) UNVULCANIZED RUBBER COMPOSITION, PROCESS FOR PRODUCING SAME, AND PNEUMATIC TIRE

(75) Inventor: Takashi Miyasaka, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 248 days.

This patent is subject to a terminal disclaimer.

(21) Appl. No.: 13/977,841

(22) PCT Filed: Oct. 27, 2011

(86) PCT No.: PCT/JP2011/074814
§ 371 (c)(1),
(2), (4) Date: Jul. 1, 2013

(87) PCT Pub. No.: WO2012/127728
PCT Pub. Date: Sep. 27, 2012

(65) Prior Publication Data
US 2013/0281570 A1    Oct. 24, 2013

(30) Foreign Application Priority Data

Mar. 22, 2011  (JP) ................................. 2011-062862

(51) Int. Cl.
  C08K 3/04    (2006.01)
  C08C 1/14    (2006.01)
  C08J 3/215   (2006.01)
  C08L 9/08    (2006.01)
  B60C 1/00    (2006.01)
  C08J 3/22    (2006.01)

(52) U.S. Cl.
  CPC ... C08K 3/04 (2013.01); B60C 1/00 (2013.01); C08C 1/14 (2013.01); C08J 3/215 (2013.01); C08J 3/22 (2013.01); C08L 9/08 (2013.01); C08J 2307/02 (2013.01); C08J 2309/10 (2013.01)

(58) Field of Classification Search
  CPC ............ C08K 3/04; C08J 3/22; C08J 2307/02
  See application file for complete search history.

(56) References Cited

U.S. PATENT DOCUMENTS 4,098,715 A    7/1978  Masuko et al.
4,481,329 A    11/1984 Ambler et al.
6,841,606 B2   1/2005  Yanagisawa et al.
7,932,307 B2   4/2011  Yamada et al.
8,053,496 B1 * 11/2011 Minouchi et al. ............. 523/351
8,110,620 B1 *  2/2012 Minouchi ...................... 523/351
2003/0088006 A1* 5/2003 Yanagisawa et al. .......... 524/425
2009/0036596 A1* 2/2009 Miyasaka et al. ........... 524/575.5
2009/0062455 A1* 3/2009 Narita et al. ................... 524/571
2009/0088496 A1* 4/2009 Miyasaka et al. ............. 523/334
2010/0144951 A1   6/2010 Yamada et al.
2012/0053264 A1   3/2012 Nakayama et al.

FOREIGN PATENT DOCUMENTS

| JP | 50-107038 A | 8/1975 |
| JP | 58-152031 A | 9/1983 |
| JP | 60-104135 A | 6/1985 |
| JP | 2001-323071 A | 11/2001 |
| JP | 2004-99625 A | 4/2004 |
| JP | 2006-213804 A | 8/2006 |
| JP | 2007-197622 A | 8/2007 |
| JP | 2008-189718 A | 8/2008 |
| WO | 2010/107032 A1 | 9/2010 |

OTHER PUBLICATIONS

Machine Translation of JP 2001-323071 (2001).*
Notification of Transmittal of Translation of the International Preliminary Report on Patentability (Form PCT/IB/338) of International Application No. PCT/JP2011/074814 mailed on Oct. 3, 2013 with Forms PCT/IB/373and PCT/ISA/237 (7 pages).
International Search Report dated Dec. 27, 2011, issued in corresponding application No. PCT/JP2011/074814.
Office Action dated Apr. 29, 2014, issued in Corresponding Chinese Patent Application No. 2011800694445, with English Translation (14 pages).
Office Action dated Jul. 17, 2014, issued in corresponding Japanese Patent Application No. 2011-062862, with English Translation (6 pages).
Office Action dated Dec. 23, 2014, issued in corresponding Chinese Application No. 2011800694445, w/English translation. (13 pages).

* cited by examiner

Primary Examiner — Hannah Pak
(74) Attorney, Agent, or Firm — Westerman, Hattori, Daniels & Adrian, LLP

(57) ABSTRACT

A process for producing an unvulcanized rubber composition comprising a rubber wet master batch yielded by using, as raw materials, at least a filler, a dispersing solvent and a rubber latex solution, the rubber latex solution comprising two or more rubber latex solution species different from each other, and the process comprising a step (I) of dispersing the filler into the dispersing solvent to produce a filler-containing slurry solution, a step (II) of mixing the filler-containing slurry solution with the rubber latex solution to produce a filler-containing rubber latex solution, and a step (III) of coagulating and drying the filler-containing rubber latex solution to produce the rubber wet master batch.

7 Claims, No Drawings

UNVULCANIZED RUBBER COMPOSITION, PROCESS FOR PRODUCING SAME, AND PNEUMATIC TIRE

TECHNICAL FIELD

The present invention relates to an unvulcanized rubber composition containing a rubber wet master batch yielded by using, as raw materials, at least a filler, a dispersing solvent and a rubber latex solution; a process for producing the same; and a pneumatic tire.

BACKGROUND ART

Hitherto, it has been known that in the rubber industry, at the time of producing a rubber composition containing a filler such as carbon black, a rubber wet master batch is used to improve the composition in workability and improve the filler in dispersibility. This is a matter obtained by mixing the filler and a dispersing solvent with each other beforehand at a predetermined blend ratio, dispersing the filler into the dispersing solvent by mechanical force to prepare a filler-containing slurry solution, mixing this solution with a rubber latex solution in a liquid phase, adding to the mixture a coagulant such as an acid, and then collecting and drying the resultant coagulated product. The use of a rubber wet master batch gives a rubber composition better in filler-dispersing performance, and better in rubber properties such as workability and reinforceability than the use of a rubber dry master batch obtained by mixing a filler with a rubber in a solid phase. The use of such a rubber composition as a raw material makes it possible to produce, for example, a pneumatic tire decreased in rolling resistance and made excellent in fatigue resistance, or other rubber products.

Patent Document 1 listed below describes, as a process for producing a natural rubber wet master batch, a process for producing a natural rubber wet master batch, including the step of mixing a natural rubber latex with a slurry solution in which a filler such as carbon black is beforehand dispersed in water, wherein about the particle size distribution of the filler in the slurry solution, the 90%-by-volume particle diameter (D90) of the particles is adjusted to 30 μm or less. Patent Document 2 listed below describes, as a natural rubber wet master batch rubber composition, a natural rubber wet master batch rubber composition obtained by a producing process of mixing a natural rubber latex with a slurry solution in which carbon black is beforehand dispersed in water.

PRIOR ART DOCUMENTS

Patent Documents

Patent Document 1: JP-A-2004-99625
Patent Document 2: JP-A-2006-213804

SUMMARY OF THE INVENTION

Problems to be Solved by the Invention

However, the present inventors have made eager investigations to find out that about a vulcanized rubber of the natural rubber wet master batch rubber composition obtained by the producing process described in each of these patent documents, there remains a room for a further improvement from the viewpoint of generated-heat resistance, strength, fatigue resistance, tearing resistance, and adhesive property. Additionally, the following has also been found out that: the producing processes described in these patent documents each have the step of mixing a natural rubber latex with a slurry solution in which carbon black is beforehand dispersed in water; therefore, in a case where after the preparation of the slurry solution, much time is required up to the step of mixing the slurry solution with the natural rubber latex, re-aggregation of the filler such as carbon black advances easily in the slurry solution, and further even after the resultant mixture is prepared into a natural rubber wet master batch rubber the re-aggregation of the filler advances easily, so that in the rubber composition to be finally obtained, a locally poor dispersion of carbon black may be unfavorably caused. When the re-aggregation of the filler advances in the slurry solution and further in the natural rubber wet master batch so that the dispersion of the carbon black becomes locally poor, the rubber composition is declined in physical properties such as generated-heat resistance, strength, fatigue resistance, tearing resistance, and adhesive property. Accordingly, in the process for producing an unvulcanized rubber composition containing a rubber wet master batch, there remains a room for a further improvement in the actual circumstances when physical properties of a vulcanized rubber to be finally produced are considered.

In light of the actual circumstances, the present invention has been made. An object thereof is to provide an unvulcanized rubber composition that comprises a rubber wet master batch in which a filler is evenly dispersed and the filler is restrained from re-aggregating with time, and that can be a raw material for a vulcanized rubber improved with a good balance in generated-heat resistance, strength and fatigue resistance and made excellent in tearing resistance, and adhesive property; and a process for producing the composition.

Means for Solving the Problems

As described below, the object can be attained by the present invention. The present invention is a process for producing an unvulcanized rubber composition comprising a rubber wet master batch yielded by using, as raw materials, at least a filler, a dispersing solvent and a rubber latex solution, the rubber latex solution comprising two or more rubber latex solution species different from each other, and the process comprising a step (I) of dispersing the filler into the dispersing solvent to produce a filler-containing slurry solution, a step (II) of mixing the filler-containing slurry solution with the rubber latex solution to produce a filler-containing rubber latex solution, and a step (III) of coagulating and drying the filler-containing rubber latex solution to produce the rubber wet master batch.

According to this producing process, the rubber-wet-master-batch-comprising rubber composition is produced by way of the individual steps of (I) to (III) so that filler in the rubber composition is excellent in dispersibility, and the composition is improved in generated-heat resistance.

Furthermore, according to the producing process, the rubber wet master batch is produced using, as raw materials, two or more rubber latex solution species different from each other, so that the vulcanized rubber to be finally obtained is to be remarkably improved in tearing resistance and adhesive property. The reason why this advantageous effect is obtained is unclear; however, it is presumed that as compared with the case of dry-mixing different rubber species with each other, the case of mixing different rubber species in the state of being a rubber latex solution makes the compatibility between these species higher so that the vulcanized rubber to be finally obtained is to be remarkably improved in tearing resistance and adhesive property. In the producing process, at the stage of the step (I), the two or more rubber latex solution species may be used. In the step (I) and the step (II), the different rubber latex solution species may be used. Alternatively, at the stage of the step (II), the two or more rubber latex solution species may be used.

In the producing process, it is preferred that the step (I) is a step (I-(a)) of adding, when the filler is dispersed into the dispersing solvent, at least one portion of the rubber latex solution to the filler and/or the dispersing solvent to produce the filler-containing slurry solution wherein rubber latex particles adhere to the filler, and the step (II) is a step (II-(a)) of mixing the filler-containing slurry solution, wherein the rubber latex particles adhere to the filler, with the rest of the rubber latex solution to produce the filler-containing rubber latex solution which is a latex solution wherein the rubber latex particles adhere to the filler.

According to this producing process, in the step of producing the rubber wet master batch, which is a raw material of the unvulcanized rubber composition, at least one portion of the rubber latex solution is, when the filler is dispersed into the dispersing solvent, added to the filler and/or the dispersing solvent to produce the filler-containing slurry solution, which is a slurry solution wherein rubber latex particles adhere to the filler (step (I-(a)). In this way, a very thin latex phase is produced on a part or the whole of the surface of the filler. When the rest of the rubber latex solution is mixed therewith in the step (II-(a)), the filler can be prevented from re-aggregating. Furthermore, also in the step (III) of coagulating and drying the filler-containing rubber latex solution, in which the rubber latex particles adhere to the filler, the filler can be restrained from re-aggregating. As a result, the obtained rubber wet master batch can be a master batch in which the filler is evenly dispersed and the dispersion stability of the filler over time is excellent.

In the above-mentioned step of producing the rubber wet master batch, the dispersibility of the filler in the slurry solution is better and additionally the filler can be further prevented from re-aggregating than in the case of producing a slurry solution merely by dispersing a filler into a dispersing solvent. Thus, the present invention also produces an advantageous effect that the slurry solution is also excellent in storage stability.

In the producing process, it is preferred that the rubber latex solution comprises a natural rubber latex solution, and one or more selected from the group consisting of styrene-butadiene rubber latex solutions, butadiene rubber latex solutions and isoprene rubber latex solutions. According to this subject matter, the vulcanized rubber to be finally obtained can be improved, with an especially good balance, in all of generated-heat resistance, strength, fatigue resistance, tearing resistance, and adhesive property.

In the producing process, it is preferred that in the step (I-(a)), the 90%-volume particle diameter (D90) of the filler to which the rubber latex particles adhere is 31 μm or more in the slurry solution. According to this subject matter, the dispersibility of the filler in the slurry solution is excellent and additionally the filler can be prevented from re-aggregating. Thus, the slurry solution is excellent in storage stability, and further an unvulcanized rubber composition can be produced which can finally give a vulcanized rubber excellent in generated-heat resistance, endurance and rubber strength. In the present invention, the D90 of the filler to which the rubber latex particles adhere means a value obtained by measuring a target including not only the filler but also the rubber latex particles adhering thereto.

In the producing process, it is preferred that in the step (I-(a)), the solid (rubber) content in the rubber latex solution to be added is from 0.25 to 15% by mass of the filler. In the producing process, it is also preferred that in the step (I-(a)), the solid (rubber) concentration in the rubber latex solution to be added is from 0.2 to 5% by mass. According to these subject matters, in the step of producing the rubber wet master batch, which is a raw material of the unvulcanized rubber composition, the obtained rubber wet master batch can be a master batch in which the rubber latex particles adhere certainly to the filler and further the dispersion degree of the filler is heightened.

In the producing process, it is preferred that the step (I-(a)) is a step of mixing at least one portion of the rubber latex solution beforehand with the dispersing solvent, and then adding the filler to the mixture to be dispersed therein, thereby producing the filler-containing slurry solution, wherein the rubber latex particles adhere to the filler. According to this producing process, in the step (I-(a)) the rubber latex particles adhere more evenly to the filler with a higher certainty. This matter makes it possible to restrain the re-aggregation of the filler in the entire step of producing the rubber wet master batch with a higher certainty.

It is preferred that the producing process further comprises a step (IV) of dry-mixing the rubber wet master batch yielded after the step (III) with a dry rubber identical in species to any of the rubbers contained in the rubber latex solution. When the rubber wet master batch has undergone this step (IV), an unvulcanized rubber composition can be produced which is remarkably improved in generated-heat resistance and fatigue resistance. The cause therefor is unclear. Probably, however, the cause is presumed as follows: when the rubber wet master batch is dry-mixed with the dry rubber identical in species to one of the rubbers constituting the rubber wet master batch, the Tg of the rubber components in the rubber wet master batch is near to that of the dry rubber, so that these rubbers are easily made sufficiently compatible with each other at the dry-mixing time. It is presumed that this matter results in a remarkable improvement in the resultant unvulcanized rubber composition in generated-heat resistance and fatigue resistance.

In the present invention, the "dry-mixing" means that two or more miscible components, for example, a rubber wet master batch and a dry rubber are mixed with each other in the state of adjusting the water content by percentage in the whole of the miscible components to 5% or less. A specific method for this dry-mixing is a method of mixing the miscible components, using a mixing or kneading machine, such as a Banbury mixer, an open roll or a co-kneader.

The unvulcanized rubber composition according to the present invention is a composition produced by the producing process recited in any one of the above-mentioned paragraphs concerned. About this rubber composition, the filler contained therein is evenly dispersed and the dispersion stability of the filler over time is excellent. Additionally, the composition contains the two or more different rubbers, and further these rubbers are high in compatibility with each other. Accordingly, for example, a pneumatic tire yielded by use of this rubber composition is improved, with a good balance, in generated-heat resistance, strength, and fatigue resistance, and is further excellent in tearing resistance and adhesive property.

MODE FOR CARRYING OUT THE INVENTION

The rubber composition according to the present invention contains a rubber wet master batch yielded by using, as raw materials, at least a filler, a dispersing solvent and a rubber latex solution.

In the present invention, the filler means an inorganic filler used ordinarily in the rubber industry, such as carbon black, silica, clay, talc, calcium carbonate, magnesium carbonate, or aluminum hydroxide. Among these inorganic fillers, carbon black is in particular suitably usable in the present invention.

The carbon black used may be a carbon black species used in an ordinary rubber industry, such as SAF, ISAF, HAF, FEF or GPF, or an electroconductive carbon black species such as acetylene black or Ketjen Black. The carbon black may be a granulated carbon black species, which has been granulated, considering the handleability thereof in an ordinary rubber industry, or may be a non-granulated carbon black species.

The dispersing solvent used is in particular preferably water, and may be, for example, water containing an organic solvent.

The rubber latex solution used may be a natural rubber latex solution, and one or more selected from the group consisting of styrene-butadiene rubber latex solutions, butadiene rubber latex solutions and isoprene rubber latex solutions.

The natural rubber latex solution is a natural product based on metabolic effect of a plant, and is in particular preferably of a natural-rubber/water system type, in which water is a dispersing solvent. The number-average molecular weight of the natural rubber in the natural rubber latex used in the present invention is preferably 2,000,000 or more, more preferably 2,500,000 or more. About the natural rubber latex, a concentrated latex, a fresh latex called a field latex, and others are usable without being distinguished from each other.

The styrene-butadiene rubber latex solutions, the butadiene rubber latex solutions and/or the isoprene rubber latex solutions may each be a solution obtained by polymerizing constituent monomers thereof by a known method such as emulsion polymerization, or may be a commercially available product. Examples of the commercially available product include a styrene-butadiene rubber latex solution "ROADEX" manufactured by JSR Corp., a butadiene rubber latex solution "Nipol LX111K" manufactured by Zeon Corp. and an isoprene rubber latex solution "IR100K" manufactured by Sumitomo Seika Chemicals Co., Ltd.

Hereinafter, a description will be made about the process for producing a rubber composition according to the present invention. This producing process is characterized by using, as raw materials, two or more rubber latex solution species different from each other, and having a step (I) of dispersing a filler into a dispersing solvent to produce a filler-containing slurry solution, a step (II) of mixing the filler-containing slurry solution with the rubber latex solution species to produce a filler-containing rubber latex solution, and a step (III) of coagulating and drying the filler-containing rubber latex solution to produce a rubber wet master batch.

In the present invention, it is particularly preferred that the step (I) is a step (I-(a)) of adding, when the filler is dispersed into the dispersing solvent, at least one portion of the rubber latex solution species to the filler and/or the dispersing solvent to produce the filler-containing slurry solution wherein rubber latex particles adhere to the filler, and the step (II) is a step (II-(a)) of mixing the filler-containing slurry solution, wherein the rubber latex particles adhere to the filler, with the rest of the rubber latex solution species to produce the filler-containing rubber latex solution which is a latex solution wherein the rubber latex particles adhere to the filler. Hereinafter, the step (I-(a)), and the step (II-(a)) will be described. In the present embodiment, a description will be made, particularly, about an example using carbon black as the filler.

(1) (1) Step (I-(a))

In the step (I-(a)), at least one portion of one or more rubber latex solution species is added, when carbon black is dispersed into a dispersing solvent, to carbon black and/or the dispersing solvent to produce a slurry solution containing carbon black to which rubber latex particles adhere. About the rubber latex solution species, it is allowable to mix the solution species beforehand with the dispersing solvent, add carbon black to the mixture, and disperse carbon black therein. It is also allowable to add carbon black into the dispersing solvent, and next disperse carbon black in the dispersing solvent while the rubber latex solution species is/are added to the dispersing solvent at a predetermined addition rate, or to add carbon black to the dispersing solvent, and next disperse carbon black in the dispersing solvent while a predetermined volume of the rubber latex solution species is added portionwise to the dispersing solvent. By dispersing carbon black into the dispersing solvent in the state that the rubber latex solution species is/are present, a slurry solution can be produced which contains carbon black to which rubber latex particles adhere. In the step (I-(a)), the addition amount of the rubber latex solution species is, for example, from 0.075 to 12% by mass of the total of the used rubber latex solution species (the total of the species added in the step (I-(a)) and the step (II-(a)). In the step (I-(a)), the rubber latex solution species may be two or more rubber latex solution species different from each other, or a single rubber latex solution species. However, when the single rubber latex solution species is used in the step (I-(a)), in the step (II-(a)) detailed later, use is made of a different rubber latex solution species different from the rubber latex solution species used in the step (I-(a)).

In step (I-(a)), the solid (rubber) content in the rubber latex solution species to be added is preferably from 0.25 to 15% by mass of carbon black, preferably from 0.5 to 6% by mass thereof. Moreover, the solid (rubber) concentration in the rubber latex solution species to be added is preferably from 0.2 to 5% by mass, more preferably from 0.25 to 1.5% by mass. In these cases, it is possible to produce a rubber wet master batch in which dispersion degree of carbon black is heightened while rubber latex particles are certainly caused to adhere to carbon black.

In the step (I-(a)), the method for mixing carbon black with the dispersing solvent in the presence of the rubber latex solution species may be a method of dispersing carbon black, using an ordinary dispersing machine, such as a high-shearing mixer, a High Shear Mixer, a homo-mixer, ball mills, bead mills, a high-pressure homogenizer, an ultrasonic homogenizer, or a colloid mill.

The "high-shearing mixer" means a mixer having a rotor and a stator in which the rotor capable of being rotated at a high velocity is rotated in the state that a precise clearance is set between the rotor and the stator, which is fixed, so that a high-shearing effect acts. In order that the mixer can produce such a high-shearing effect, it is preferred to set the clearance between the rotor and the stator to 0.8 mm or less, and adjust the peripheral velocity of the rotor to 5 m/s or more. Such a high-shearing mixer may be a commercially available product. An example thereof is a "High Shear Mixer" manufactured by Silverson Co.

In the present invention, at the time of mixing carbon black with the dispersing solvent in the rubber latex solution species to produce the slurry solution, which contains carbon black to which the rubber latex particles adhere, a surfactant may be added thereto in order to improve the dispersibility of carbon black. The surfactant may be any surfactant known in the rubber industry. Examples thereof include nonionic surfactants, anionic surfactants, cationic surfactants, and amphoteric ion surfactants. Instead of the surfactant, or in addition thereto, an alcohol such as ethanol may be used. However, when the surfactant is used, it is feared that the vulcanized rubber to be finally obtained is declined in rubber properties. Thus, the blend amount of the surfactant is preferably 2 parts or less by mass, more preferably 1 part or less by mass for 100 parts by mass of the solid (rubber) in the rubber latex solution species. It is preferred that the surfactant is not substantially used.

About carbon black to which the rubber latex particles adhere in the slurry solution produced in the step (I-(a)), the 90%-by-volume particle diameter (μm) ("D90") thereof is preferably 31 μm or more, more preferably 35 μm or more. In this case, carbon black in the slurry solution is excellent in dispersibility, and can be further prevented from re-aggregating. Accordingly, the slurry solution is excellent in storage stability, and further the vulcanized rubber to be finally obtained is also excellent in generated-heat resistance, endurance, and rubber strength.

(2) Step (II-(a))

In the step (II-(a)), the slurry solution is mixed with the rest of the rubber latex solution species to produce a carbon-black-containing rubber latex solution in which the rubber latex particles adhere to carbon black. The method for mixing the slurry solution with the rest of the rubber latex solution species in a liquid phase is not particularly limited, and may be a method of mixing the slurry solution with the rest of the rubber latex solution species, using an ordinary dispersing machine, such as a high-shearing mixer, a High Shear Mixer, a homo-mixer, ball mills, bead mills, a high-pressure homogenizer, an ultrasonic homogenizer, or a colloid mill. If necessary, the whole of the mixing system, such the dispersing machine, may be heated at the time of the mixing.

It is preferred that the rest of the rubber latex solution species is higher in solid (rubber) concentration than the rubber latex solution species added in the step (I-(a)) in the case of considering a drying period and labor in the next step (III). Specifically, the solid (rubber) concentration is preferably from 10 to 60% by mass, more preferably from 20 to 30% by mass.

(3) Step (III)

In the step (III), the carbon-black-containing rubber latex solution, in which the rubber latex particles adhere to carbon black, is coagulated and dried to produce a rubber wet master batch. The method for the coagulating and drying may be a coagulating and drying method of incorporating a coagulant into the carbon-black-containing rubber latex solution, in which the rubber latex particles adhere to carbon black, and drying, after the coagulation, the coagulated product; or may be a drying and solidifying method of drying the latex solution without being coagulated.

The coagulant used in the coagulating and drying method may be an acid, such as formic acid or sulfuric acid, or a salt such as sodium chloride, which is ordinarily used to coagulate a rubber latex solution.

For the method for drying the carbon-black-containing rubber latex solution, various drying machines are usable, examples thereof including an oven, a vacuum drying machine, and an air drier.

In the present invention, it is allowable to incorporate the coagulant into the carbon-black-containing rubber latex solution, in which the rubber latex particles adhere to carbon black, this solution being obtained by mixing the slurry solution containing carbon black to which the rubber latex particles adhere with rubber latex solution species in a liquid phase; and subsequently collect and dry the resultant coagulated product. As the coagulant, a coagulant known as a coagulant for a rubber latex solution is usable without any limitation. A specific example thereof is a cationic coagulant.

The rubber wet master batch yielded after the step (III) preferably contains 40 to 80 parts by mass of carbon black for 100 parts by weight of the rubber. In this case, the rubber wet master batch produced can be a rubber wet master batch improved, with a good balance, not only in dispersion degree of carbon black therein, and but also in generated-heat resistance and endurance when produced into a vulcanized rubber.

About the rubber wet master batch yielded after the step (III), carbon black contained therein is evenly dispersed and the dispersion stability of carbon black over time is excellent.

(4) Step (IV)

In the present invention, the producing process may have a step (IV) of dry-mixing the rubber wet master batch yielded after the step (III) with a dry rubber identical in species to one of the rubbers contained in the rubber latex solution species. In this step (IV), it is preferred to satisfy the following: A/B=90/10 to 70/30 wherein A represents the amount of the whole of the rubber components in the rubber wet master batch, and B represents the amount of the whole of the rubber component in the dry rubber. When the amount of the whole of the rubber components in the rubber composition is regarded as 100 parts by mass, it is preferred that the composition further contains 0 to 5 parts by mass of carbon black.

At the time of dry-mixing the rubber wet master batch with the dry rubber in the step (IV), or in a step subsequent to the step (III), a compounding agent used ordinarily in the rubber industry may be mixed with the master batch if necessary. Examples thereof include a sulfur-containing vulcanizer, a vulcanization promoter, silica, a silane coupling agent, zinc oxide, stearic acid, a vulcanization promoting aid, a vulcanization retardant, an organic peroxide, an anti-ageing agent, a softener such as wax or oil, and a processing aid.

A sulfur species in the sulfur-containing vulcanizer may be an ordinary sulfur species for rubber, and may be, for example, powdery sulfur, precipitated sulfur, insoluble sulfur, or highly-dispersible sulfur. The sulfur content in the rubber composition according to the present invention is preferably from 0.3 to 6.5 parts by mass for 100 parts by weight of the rubber components. If the sulfur content is less than 0.3 parts by mass, the vulcanized rubber is insufficient in crosslinkage density to be lowered in rubber strength and others. If the content is more than 6.5 parts by mass, the vulcanized rubber is deteriorated in both of heat resistance and endurance. In order that the vulcanized rubber can ensure rubber strength satisfactorily and be further improved in heat resistance and endurance, the sulfur content is more preferably from 1.5 to 5.5 parts by mass, even more preferably from 2 to 4.5 parts by mass for 100 parts by mass of the rubber components.

Examples of the vulcanization promoter include sulfenamide type vulcanization promoters, thiuram type vulcanization promoters, thiazole type vulcanization promoters, thiourea type vulcanization promoters, guanidine type vulcanization promoters, and dithiocarbamate type vulcanization promoters, which are ordinarily used for rubber-vulcanization. These may be used alone or in an appropriate mixture form. The content of the vulcanization promoter is more preferably from 1 to 5 parts by mass, even more preferably from 1.5 to 4 parts by mass for 100 parts by mass of the rubber components.

Examples of the anti-ageing agent include aromatic amine type anti-ageing agents, amine-ketone type anti-ageing agents, monophenol type anti-ageing agents, bisphenol type anti-ageing agents, polyphenol type anti-ageing agents, dithiocarbamate type anti-ageing agents, and thiourea type anti-ageing agents, which are ordinarily used for rubber.

These may be used alone or in an appropriate mixture form. The content of the anti-ageing agent is more preferably from 1 to 5 parts by mass, even more preferably from 2 to 4.5 parts by mass for 100 parts by mass of the rubber components.

As described above, about the rubber wet master batch produced after the step (III) and/or the step (IV), the filler contained therein is evenly dispersed and the dispersion stability of the filler over time is excellent. Accordingly, also about an unvulcanized rubber composition produced by use of this master batch, the filler contained therein is evenly dispersed and the dispersion stability of the filler over time is excellent. Furthermore, the unvulcanized rubber composition according to the present invention contains two or more different rubbers, and further these rubbers are high in compatibility therebetween. For this reason, a pneumatic tire produced by use of this unvulcanized rubber composition has a rubber region which is good in the dispersibility of the filler therein, and is not only improved, with a good balance, in generated-heat resistance, strength and fatigue resistance but also made excellent in tearing resistance and adhesive property. The tire is specifically a pneumatic tire in which the rubber composition according to the present invention is used for its tread rubber, side rubber, ply or belt coating rubber, or bead filler rubber.

EXAMPLES

Hereinafter, working examples of this invention will be described to explain the present invention in more detail.

(Used Raw Materials)

a) Carbon black

Carbon black "N326": "SHEAST 300" (manufactured by Tokai Carbon Co., Ltd.)

Carbon black "N110": "SHEAST 9" (manufactured by Tokai Carbon Co., Ltd.)

Carbon black "N330": "SHEAST 3" (manufactured by Tokai Carbon Co., Ltd.)

b) Dispersing solvent: water c) Rubber latex solution species

Natural rubber latex solution (NR concentrated latex) manufactured by Regitex Co., Ltd. (DRC (dry rubber content)=60%)

Natural rubber latex solution (NR field latex) manufactured by Golden Hope Co. (DRC=30.5%)

Styrene-butadiene rubber latex solution (SBR latex solution): "ROADEX (DCR=50%)" (manufactured by JSR Corp.)

Butadiene rubber latex solution (BR latex solution): "Nipol LX111K (TSC=55.0%)" (manufactured by Zeon Corp.)

Isoprene rubber latex solution (IR latex solution): "SEPOLEX IR100K (TSC=65.4%)" (manufactured by Sumitomo Seika Chemicals Co., Ltd.)

d) Coagulant: formic acid (adjusted into a pH of 1.2 by diluting a 10% solution of a first class 85%-concentration agent thereof) (manufactured by Nacalai Tesque, Inc.)

e) Dry rubbers

Natural rubber (NR): "RSS #3" (produced in Thailand)

Styrene-butadiene rubber (SBR): "SBR 1502" (manufactured by JSR Corp.)

Butadiene rubber (BR): "Nipol BR1220" (manufactured by Zeon Corp.)

Isoprene rubber (IR): "IR 2200" (manufactured by JSR Corp.)

f) Zinc flower: ZINC FLOWER No. 3 (manufactured by Mitsui Mining & Smelting Co., Ltd.)

g) Anti-ageing agent: 6PPD (manufactured by Monsanto Co.)

h) Sulfur: "Crystex OT-20" (manufactured by Akzo Nobel N.V.

i) Vulcanization promoter:

N,N-dicyclohexylbenzothiazole-2-sulfenamide: "NOCCELER DZ" (manufactured by Ouchi Shinko Chemical Industrial Co., Ltd.)

j) Resorcin: "SUMIKANOL 620" (manufactured by Sumitomo Chemical Co., Ltd.)

k) Melamine derivative: "SAIRETTSU 963L"

Example 1

Carbon black was added to a styrene-butadiene rubber diluted latex solution in water, which was adjusted to a concentration of 0.26% by mass, so as to give a blend amount described in Table 1 (the concentration of carbon black in water: 5% by mass). A machine, ROBOMIX, manufactured by Primix Corp. was used to disperse carbon black in this latex solution (ROBOMIX conditions: 9000 rpm for 30 minutes) to produce a carbon-black-containing slurry solution shown in Table 1 in which styrene-butadiene rubber latex particles adhered to carbon black (step (I-(a))). The D90 of the carbon-black-containing slurry solution produced in the step (I-(a)), in which the styrene-butadiene rubber latex particles adhered to carbon black, was 58 μm. In the step (I-(a)), the solid (rubber) content in the styrene-butadiene rubber diluted latex solution in water (the proportion by mass of the solid to carbon black) was 5%.

Next, a styrene-butadiene rubber latex solution (rubber component: 55 parts by mass) and a natural rubber latex solution (rubber component: 12.5 parts by mass) were diluted with water and mixed with each other to give a total concentration of 25% by mass, and this mixture was added to the carbon-black-containing slurry solution produced in the step (I-(a)), in which the styrene-butadiene rubber latex particles adhered to carbon black, to give a blend amount shown in Table 1. Next, a home mixer, SM-L56 model, manufactured by Sanyo Electric Co., Ltd. was used to mix these components (mixer concentration: 11300 rpm for 30 minutes) to produce a carbon-black-containing rubber latex solution in which the styrene-butadiene rubber latex particles adhered to carbon black (step (II)).

Formic acid as a coagulant was added to the carbon-black-containing natural rubber latex solution produced in the step (II), in which the styrene-butadiene rubber latex particles adhered to carbon black, until the pH of the whole of the solution would be 4. A screw press, V-01 model, manufactured by Suchiro EPM Corp. was used to dry the coagulated product into a water content by percentage of 1.5% or less. In this way, a rubber wet master batch was produced (step (III)).

A Banbury mixer was used to dry-mix 70 parts by mass of the resultant rubber wet master batch and 30 parts by mass of a dry rubber (natural rubber) together with various additives described in Table 1. In this way, a rubber composition according to Example 1 was produced (step (IV)).

Examples 2 to 10, and Comparative Examples 1 to 8

A rubber composition was produced (in each of these examples) in the same way as in Example 1 except that the rubber latexes used in the steps (I) to (III)/(IV), and the respective blend amounts thereof were changed into those shown in Tables 1 to 3, respectively. In Comparative Example 1, carbon black, a dry rubber and various additives were merely dry-mixed with each other to produce a rubber composition.

(Evaluations)

A predetermined mold was used to heat and vulcanize each of the rubber compositions at 150° C. for 30 minutes. The resultant rubber was evaluated.

(Particle Size Distribution (90%-by-Volume Particle Diameter (D90))

The D90 (μm) of the filler to which the rubber latex particles adhered in the slurry solution produced in the step (I-(a)) (in each of the examples) was measured, using a device "SALD 2200" manufactured by Shimadzu Corp. (refractive index of CB: 2.0-0.10i) in the state that the absorbance at the time of the measurement was set to 0.01 to 0.1.

(Generated-Heat Resistance of Each Vulcanized Rubber)

According to JIS K6265, the heat-generating property of each of the produced vulcanized rubbers was evaluated through the loss tangent tan δ thereof. The tan δ was measured, using a rheospectrometer E4000 manufactured by UBM at 50 Hz, 80° C. and a dynamic strain of 2%. The measured value was converted into an index. In the evaluations (of all the examples), the results of Examples 1 to 7 and Comparative Examples 1 to 3 were each shown as an index value when the result of Comparative Example 1 was regarded as 100. Those of Examples 8 to 9, and Comparative Examples 4 to 6 were each shown as an index value when the result of Comparative Example 4 was regarded as 100. Those of Example 10, and Comparative Examples 7 to 8 were each shown as an index value when the result of Comparative Example 7 was regarded as 100. It is meant that as these values are each smaller in number to be lower in heat-generating property, a better result is produced.

(Rubber Strength (TB) of Each Vulcanized Rubber)

A JIS #3 dumbbell was used to make each of the rubbers into a sample, and the tensile strength (TB (MPa)) thereof was measured in accordance with JIS-K 6251. In the evaluations, the results of Examples 1 to 7 and Comparative Examples 1 to 3 were each shown as an index value when the result of Comparative Example 1 was regarded as 100. Those of Examples 8 to 9, and Comparative Examples 4 to 6 were each shown as an index value when the result of Comparative Example 4 was regarded as 100. It is meant that as these TB values are each larger in number to be higher in rubber strength, a better result is produced.

(Fatigue Resistance of Each Vulcanized Rubber)

The fatigue resistance of each of the produced vulcanized rubbers was evaluated in accordance with JIS K6260. In the evaluations, the results of Examples 1 to 7 and Comparative Examples 1 to 3 were each shown as an index value when the result of Comparative Example 1 was regarded as 100. Those of Examples 8 to 9, and Comparative Examples 4 to 6 were each shown as an index value when the result of Comparative Example 4 was regarded as 100. It is meant that as these values are each larger in number, a better fatigue resistance is exhibited.

(Tearing Resistance of Each Vulcanized Rubber)

The tearing resistance of each of the produced vulcanized rubbers was evaluated in accordance with JIS K6252. In the evaluations, the results of Examples 1 to 7 and Comparative Examples 1 to 3 were each shown as an index value when the result of Comparative Example 1 was regarded as 100. Those of Examples 8 to 9, and Comparative Examples 4 to 6 were each shown as an index value when the result of Comparative Example 4 was regarded as 100. It is meant that as these values are each larger in number, a better tearing resistance is exhibited.

(Adhesive Property of Each Vulcanized Rubber)

In a peel adhesion test, adhesion-treated cords arranged at a count of 22 cords/25-mm and coated with the rubber (of each of the examples) were laminated onto each other to make the directions of the cords parallel to each other, and then vulcanized at 140° C. for 40 minutes. Thereafter, the resultant was prepared into a peel adhesion test piece of 25 mm width. A device, "AUTOGRAPH AG-5KNI", manufactured by Shimadzu Corp. was used to make a peel test of the test piece at an interlayer-peeling rate of 50 mm/minute in an atmosphere of 22° C. temperature. The proportion of the rubber-coated areas in the peeled faces was evaluated. This rubber-coated area proportion was to be regarded as 100% if the cords were completely coated with the rubber. The proportion was to be regarded as 0% if the cords were not coated at all with the rubber. On the basis of this criterion, each of the examples was evaluated with the naked eye. It is meant that as the coated area proportion is higher in the evaluation, a better adhesive property is exhibited.

[Treatment Liquid Composition] (Epoxy Treatment Liquid for Polyester Cords)

First treatment liquid: treatment liquid containing an epoxy-compound-dispersed liquid (sorbitol polyglycidyl ether: DENACOL EX-614, manufactured by Nagese ChemteX Corp.)

Second treatment liquid: Mixed liquid of RFL

TABLE 1

| | | Comparative Example 1 | Comparative Example 2 | Comparative Example 3 | Example 1 | Example 2 | Example 3 | Example 4 | Example 5 | Example 6 | Example 7 |
|---|---|---|---|---|---|---|---|---|---|---|---|
| | | | | | Step (I) | | | | | | |
| Carbon black | Species | N326 | N326 | N326 | N326 | N326 | N326 | N326 | N326 | N326 | N326 |
| | Blend parts by mass for 100 parts by mass of rubber | 50 | 50 | 50 | 50 | 50 | 50 | 50 | 50 | 50 | 50 |
| Added rubber latex species | RUBBER CONTENT IN NR CONCENTRATED LATEX | — | 2.5 | — | — | 2.5 | 2.5 | 2.5 | — | 2.5 | — |
| | RUBBER CONTENT IN NR FIELD LATEX | — | — | — | — | — | — | — | — | — | 2.5 |
| | RUBBER CONTENT IN SBR LATEX | — | — | 2.5 | 2.5 | — | — | — | 2.5 | 2.5 | — |
| | RUBBER CONTENT IN BR LATEX | — | — | — | — | — | — | — | — | — | — |
| | RUBBER CONTENT IN IR LATEX | — | — | — | — | — | — | — | — | — | — |
| | (Added rubber latex concentration) (proportion to the amount of carbon black) | (—) | (5%) | (5%) | (5%) | (5%) | (5%) | (5%) | (5%) | (10%) | (5%) |

TABLE 1-continued

|  |  | Comparative Example 1 | Comparative Example 2 | Comparative Example 3 | Example 1 | Example 2 | Example 3 | Example 4 | Example 5 | Example 6 | Example 7 |
|---|---|---|---|---|---|---|---|---|---|---|---|
|  | (Added rubber latex concentration) (Solid (rubber) concentration (% by mass) | (—) | (0.26%) | (0.26%) | (0.26%) | (0.26%) | (0.26%) | (0.26%) | (0.26%) | (0.52%) | (0.26%) |
| D90 (μm) of carbon black to which rubber latex particles adhered |  | — | 67 | 58 | 58 | 67 | 67 | 67 | 58 | 127 | 64 |
|  | Step (II) | | | | | | | | | | |
| Added rubber latex species | RUBBER CONTENT IN NR CONCENTRATED LATEX | — | 82.5 | — | 55 | 82.5 | 82.5 | 82.5 | 85 | 82.5 | — |
|  | RUBBER CONTENT IN NR FIELD LATEX | — | — | — | — | — | — | — | — | — | 82.5 |
|  | RUBBER CONTENT IN SBR LATEX | — | — | 12.5 | 12.5 | 15 | 7.5 | 3.0 | 0.5 | 0.5 | 15 |
|  | RUBBER CONTENT IN BR LATEX | — | — | — | — | — | — | — | — | — | — |
|  | RUBBER CONTENT IN IR LATEX | — | — | — | — | — | — | — | — | — | — |
|  | (Added rubber latex concentration) (Solid (rubber) concentration (% by mass) | (—) | (25%) | (25%) | (25%) | (25%) | (25%) | (25%) | (25%) | (25%) | (25%) |
|  | Step (IV) | | | | | | | | | | |
| Rubber content in rubber wet master batch |  | 0 | 85 | 15 | 70 | 100 | 92.5 | 88 | 88 | 88 | 100 |
| Dry rubber species | NR | 85 | — | 85 | 30 | — | — | — | — | — | — |
|  | SBR | 15 | 15 | — | — | — | 7.5 | 12 | 12 | 12 | — |
|  | BR | | | | | | | | | | |
|  | IR | | | | | | | | | | |
| Anti-ageing agent |  | 2 | 2 | 2 | 2 | 2 | 2 | 2 | 2 | 2 | 2 |
| Zinc flower |  | 8 | 8 | 8 | 8 | 8 | 8 | 8 | 8 | 8 | 8 |
| Sulfur |  | 4.5 | 4.5 | 4.5 | 4.5 | 4.5 | 4.5 | 4.5 | 4.5 | 4.5 | 4.5 |
| Vulcanization promoter |  | 1 | 1 | 1 | 1 | 1 | 1 | 1 | 1 | 1 | 1 |
|  | Vulcanized rubber physical properties | | | | | | | | | | |
| Generated-heat resistance (tan δ) |  | 100 | 91 | 97 | 92 | 89 | 90 | 91 | 91 | 91 | 91 |
| Rubber strength (TB) |  | 100 | 109 | 98 | 105 | 120 | 117 | 115 | 114 | 115 | 120 |
| Fatigue resistance |  | 100 | 141 | 91 | 136 | 143 | 140 | 138 | 137 | 139 | 145 |
| Tearing resistance |  | 100 | 73 | 57 | 109 | 123 | 119 | 111 | 113 | 112 | 125 |
| Adhesive property |  | 50% | 60% | 65% | 95% | 95% | 90% | 90% | 90% | 90% | 95% |

From the results in Table 1, it is understood that the respective vulcanized rubbers of the unvulcanized rubber compositions according to Examples 1 to 7 are improved, with a good balance, in generated-heat resistance, strength and fatigue resistance, and are further excellent in tearing resistance and adhesive property. However, it is understood that the respective vulcanized rubbers of the unvulcanized rubber compositions according to Comparative Examples 2 and 3 are each deteriorated in tearing resistance and adhesive property since only one rubber latex solution is used in the wet master batch producing step and a different rubber is blended thereinto in the dry-mixing step.

TABLE 2

|  |  | Comparative Example 4 | Comparative Example 5 | Comparative Example 6 | Example 8 | Example 9 |
|---|---|---|---|---|---|---|
|  | Step (I) | | | | | |
| Carbon black | Species | N110 | N110 | N110 | N110 | N110 |
|  | Blend parts by mass for 100 parts by mass of rubber | 50 | 50 | 50 | 50 | 50 |
| Added rubber latex species | RUBBER CONTENT IN NR CONCENTRATED LATEX | — | 2.5 | — | 2.5 | — |
|  | RUBBER CONTENT IN NR FIELD LATEX | — | — | — | — | — |
|  | RUBBER CONTENT IN SBR LATEX | — | — | — | — | — |
|  | RUBBER CONTENT IN BR LATEX | — | — | 2.5 | — | 2.5 |
|  | RUBBER CONTENT IN IR LATEX | — | — | — | — | — |
|  | (Added rubber latex concentration) (proportion to the amount of carbon black) | (—) | (5%) | (5%) | (5%) | (5%) |
|  | (Added rubber latex concentration) (Solid (rubber) concentration (% by mass) | (—) | (0.26%) | (0.26%) | (0.26%) | (0.26%) |
| D90 (μm) of carbon black to which rubber latex particles adhered |  | — | 53 | 49 | 53 | 53 |
|  | Step (II) | | | | | |
| Added rubber latex | RUBBER CONTENT IN NR CONCENTRATED LATEX | — | 67.5 | — | 67.5 | 70 |
|  | RUBBER CONTENT IN NR FIELD LATEX | — | — | — | — | — |
|  | RUBBER CONTENT IN SBR LATEX | | | | | |

TABLE 2-continued

|  |  | Comparative Example 4 | Comparative Example 5 | Comparative Example 6 | Example 8 | Example 9 |
|---|---|---|---|---|---|---|
| species | RUBBER CONTENT IN BR LATEX | — | — | 27.5 | 30 | 12.5 |
|  | RUBBER CONTENT IN IR LATEX | — | — | — | — | — |
|  | (Added rubber latex concentration) (Solid (rubber) concentration (% by mass)) | (—) | (25%) | (25%) | (25%) | (25%) |
| Step (IV) | | | | | | |
| Rubber content in rubber wet master batch | | 0 | 70 | 30 | 100 | 85 |
| Dry rubber species | NR | 70 | — | 70 | — | — |
|  | SBR | — | — | — | — | — |
|  | BR | 30 | 30 | — | — | 15 |
|  | IR | — | — | — | — | — |
| Anti-ageing agent | | 2 | 2 | 2 | 2 | 2 |
| Zinc flower | | 8 | 8 | 8 | 8 | 8 |
| Sulfur | | 4.5 | 4.5 | 4.5 | 4.5 | 4.5 |
| Vulcanization promoter | | 1 | 1 | 1 | 1 | 1 |
| Vulcanized rubber physical properties | | | | | | |
| Generated-heat resistance (tan δ) | | 100 | 109 | 110 | 94 | 97 |
| Rubber strength (TB) | | 100 | 87 | 91 | 113 | 107 |
| Fatigue resistance | | 100 | 73 | 87 | 109 | 106 |
| Tearing resistance | | 100 | 52 | 72 | 105 | 103 |

From the results in Table 2, it is understood that the respective vulcanized rubbers of the unvulcanized rubber compositions according to Examples 8 to 9 are improved, with a good balance, in generated-heat resistance, strength and fatigue resistance, and are further excellent in tearing resistance and adhesive property. However, it is understood that the respective vulcanized rubbers of the unvulcanized rubber compositions according to Comparative Examples 5 and 6 are each deteriorated in tearing resistance and adhesive property since only one rubber latex solution is used in the wet master batch producing step and a different rubber is blended thereinto in the dry-mixing step.

TABLE 3

|  |  | Comparative Example 7 | Comparative Example 8 | Example 10 |
|---|---|---|---|---|
| Step (I) | | | | |
| Carbon black | Species | N330 | N330 | N330 |
|  | Blend parts by mass for 100 parts by mass of rubber | 50 | 50 | 50 |
| Added rubber latex species | RUBBER CONTENT IN NR CONCENTRATED LATEX | — | 2.5 | 2.5 |
|  | RUBBER CONTENT IN NR FIELD LATEX | — | — | — |
|  | RUBBER CONTENT IN SBR LATEX | — | — | — |
|  | RUBBER CONTENT IN BR LATEX | — | — | — |
|  | RUBBER CONTENT IN IR LATEX | — | — | — |
|  | (Added rubber latex concentration) (proportion to the amount of carbon black) | (—) | (5%) | (5%) |
|  | (Added rubber latex concentration) (Solid (rubber) concentration (% by mass)) | (—) | (0.26%) | (0.26%) |
| D90 (μm) of carbon black to which rubber latex particles adhered | | — | 57 | 57 |
| Step (II) | | | | |
| Added rubber latex species | RUBBER CONTENT IN NR CONCENTRATED LATEX | — | 67.5 | 67.5 |
|  | RUBBER CONTENT IN NR FIELD LATEX | — | — | — |
|  | RUBBER CONTENT IN SBR LATEX | — | — | — |
|  | RUBBER CONTENT IN BR LATEX | — | — | — |
|  | RUBBER CONTENT IN IR LATEX | — | — | 30 |
|  | (Added rubber latex concentration) (Solid (rubber) concentration (% by mass)) | (—) | (25%) | (25%) |
| Step (IV) | | | | |
| Rubber content in rubber wet master batch | | 0 | 70 | 100 |
| Dry rubber species | NR | 70 | — | — |
|  | SBR | — | — | — |
|  | BR | — | — | — |
|  | IR | 30 | 30 | — |
| Anti-ageing agent | | 2 | 2 | 2 |
| Zinc flower | | 8 | 8 | 8 |
| Resorcin | | 2 | 2 | 2 |

TABLE 3-continued

|  | Comparative Example 7 | Comparative Example 8 | Example 10 |
|---|---|---|---|
| Melamine derivative | 4 | 4 | 4 |
| Sulfur | 4.5 | 4.5 | 4.5 |
| Vulcanization promoter | 1 | 1 | 1 |
| Vulcanized rubber physical properties | | | |
| Generated-heat resistance (tan δ) | 100 | 93 | 91 |
| Rubber strength (TB) | 100 | 107 | 114 |
| Fatigue resistance | 100 | 128 | 134 |
| Tearing resistance | 100 | 71 | 116 |

From the results in Table 3, it is understood that the vulcanized rubber of the unvulcanized rubber composition according to Example 10 is improved, with a good balance, in generated-heat resistance, strength and fatigue resistance, and are further excellent in tearing resistance and adhesive property. However, it is understood that the vulcanized rubber of the unvulcanized rubber composition according to Comparative Example 8 is deteriorated in tearing resistance and adhesive property since only one rubber latex solution is used in the wet master batch producing step and a different rubber is blended thereinto in the dry-mixing step.

The invention claimed is:

1. A process for producing an unvulcanized rubber composition comprising a rubber wet master batch yielded by using, as raw materials, at least a filler, a dispersing solvent and a rubber latex solution,
   the rubber latex solution comprising two or more rubber latex solution species different from each other, and
   the process comprising a step (I) of dispersing the filler into the dispersing solvent to produce a filler-containing slurry solution,
   a step (II) of mixing the filler-containing slurry solution with the rubber latex solution to produce a filler-containing rubber latex solution, and
   a step (III) of coagulating and drying the filler-containing rubber latex solution to produce the rubber wet master batch,
   wherein the step (I) is a step (I-(a)) of adding, when the filler is dispersed into the dispersing solvent, at least one portion of the rubber latex solution to the filler and/or the dispersing solvent to produce the filler-containing slurry solution wherein rubber latex particles adhere to the filler, and wherein the step (I-(a)) is a step of mixing at least one portion of the rubber latex solution beforehand with the dispersing solvent, and then adding the filler to the mixture to be dispersed therein, thereby producing the filler-containing slurry solution, wherein the rubber latex particles adhere to the filler.

2. The process for producing the unvulcanized rubber composition according to claim 1, wherein
   the step (II) is a step (II-(a)) of mixing the filler-containing slurry solution, wherein the rubber latex particles adhere to the filler, with the rest of the rubber latex solution to produce the filler-containing rubber latex solution which is a latex solution wherein the rubber latex particles adhere to the filler.

3. The process for producing the unvulcanized rubber composition according to claim 1, wherein the rubber latex solution comprises a natural rubber latex solution, and at least one selected from the group consisting of styrene-butadiene rubber latex solutions, butadiene rubber latex solutions and isoprene rubber latex solutions.

4. The process for producing the unvulcanized rubber composition according to claim 2, wherein in the step (I-(a)), the 90%-by-volume particle diameter (D90) of the filler to which the rubber latex particles adhere is 31 μm or more in the slurry solution.

5. The process for producing the unvulcanized rubber composition according to claim 2, wherein in the step (I-(a)), the solid (rubber) content in the rubber latex solution to be added is from 0.25 to 15% by mass proportion to the amount of the filler.

6. The process for producing the unvulcanized rubber composition according to claim 2, wherein in the step (I-(a)), the solid (rubber) concentration in the rubber latex solution to be added is from 0.2 to 5% by mass.

7. The process for producing the unvulcanized rubber composition according to claim 1, further comprising a step (IV) of dry-mixing the rubber wet master batch yielded after the step (III) with a dry rubber identical in species to either one or any one of the rubbers contained in the rubber latex solution.

* * * * *